(12) United States Patent
Andersen et al.

(10) Patent No.: US 8,983,552 B2
(45) Date of Patent: Mar. 17, 2015

(54) BATTERY POWERED ELECTRONIC DEVICE COMPRISING A MOVABLE PART AND ADAPTED TO BE SET INTO SHIPPING MODE

(75) Inventors: Peter Birk Andersen, Aalborg (DK); Michael Hoby Andersen, Copenhagen (DK); Tommy Sorensen, Hadsund (DK); Jes Lundberg, Skorping (DK); Carsten Jurs, Solrod Strand (DK)

(73) Assignee: GN Netcom A/S (DK)

( * ) Notice: Subject to any disclaimer, the term of this patent is extended or adjusted under 35 U.S.C. 154(b) by 224 days.

(21) Appl. No.: 13/602,662

(22) Filed: Sep. 4, 2012

(65) Prior Publication Data

US 2013/0130749 A1 May 23, 2013

(30) Foreign Application Priority Data

Sep. 2, 2011 (DK) ................................ 2011 00662

(51) Int. Cl.
| | |
|---|---|
| *H04M 1/00* | (2006.01) |
| *H04M 1/60* | (2006.01) |
| *H04M 1/05* | (2006.01) |
| *H04B 1/38* | (2006.01) |
| *H04M 1/02* | (2006.01) |

(52) U.S. Cl.
CPC ............. *H04M 1/6066* (2013.01); *H04M 1/05* (2013.01); *H04M 1/0245* (2013.01)
USPC ........................................ 455/569.1; 381/361

(58) Field of Classification Search
CPC ............. H04R 2201/107; H04M 1/05; H04M 1/6058; H04M 1/6066
USPC ............. 455/569.1, 575.2; 381/361–362, 375
See application file for complete search history.

(56) References Cited

U.S. PATENT DOCUMENTS

| | | | |
|---|---|---|---|
| 7,020,300 B1 * | 3/2006 | Villaverde | .................... 381/375 |
| 7,031,460 B1 | 4/2006 | Zheng et al. | |
| 7,391,862 B2 | 6/2008 | Rath et al. | |
| 2004/0052364 A1 * | 3/2004 | Bodley et al. | ................. 379/430 |
| 2009/0323998 A1 * | 12/2009 | Tarvonen et al. | ............. 381/375 |
| 2011/0129107 A1 | 6/2011 | Andersen | |
| 2011/0130176 A1 | 6/2011 | Magrath et al. | |
| 2011/0188665 A1 | 8/2011 | Burge et al. | |

FOREIGN PATENT DOCUMENTS

| | | |
|---|---|---|
| EP | 1189480 | 3/2002 |
| KR | 100736244 | 6/2007 |
| WO | WO 01/86923 | 11/2001 |
| WO | WO 2006/129290 | 12/2006 |

* cited by examiner

*Primary Examiner* — Lee Nguyen
(74) *Attorney, Agent, or Firm* — Altera Law Group, LLC

(57) ABSTRACT

A battery powered electronic device (1) comprising a housing (2) and a movable part (3) extending from the housing (2). The movable part (3) is movably attached to the housing (2), such that it can be moved between a compact position and an extended position. The electronic device comprises a switch, which is adapted to sense, whether the movable part (3) is in the compact position or not, and the switch is utilized to switch the electronic device (1) On, when the movable part (3) is in the extended position, and Off, when the movable part (3) is in the compact position. The electronics of the device (1) is adapted to be set to off or into a low-power shipping mode, all though the movable part (3) is in the extended position.

17 Claims, 8 Drawing Sheets

BATTERY POWERED ELECTRONIC DEVICE COMPRISING A MOVABLE PART AND ADAPTED TO BE SET INTO SHIPPING MODE

TECHNICAL FIELD

The disclosure relates to a battery powered electronic device, such as a wireless headset, comprising a housing and a movable part extending from the housing, wherein the movable part is movably attached to the housing, such that it can be moved between a compact position and an extended position, wherein the electronic device comprises a switch, which is adapted to sense, whether the movable part is in the compact position or not, and wherein the switch is utilised to switch the electronic device On, when the movable part is in the extended position, and Off, when the movable part is in the compact position.

BACKGROUND ART

U.S. Pat. No. 7,391,862B "COMMUNICATION UNIT" (assignee GN NETCOM A/S) discloses a Bluetooth headset with a foldable microphone arm, where a switch is associated with the microphone arm, so that the headset is powered Off, when the microphone arm is flipped into a compact position, where it is lying along the housing, and powered on, when the microphone arm is flipped into an extended position, where it is ready for use. When such a headset is packaged, it is desire from the seller to present the headset as presentable as possible. Therefore, it is desirable to package a headset of the above type with the microphone arm in extended position, whereby a potential buyer can see how it looks during use through a transparent window of the package. However, if a headset according to U.S. Pat. No. 7,391,862 is packaged this way, the battery will be drained quickly, which is a disadvantage for several reasons. Firstly, it forces the user to recharge the battery before he can use it for the first time. Secondly, the battery may be partly damaged or lose capacity, if it is stored for a long time completely discharged.

A monaural headset is a headset with only one speaker, which is located close to one of the user's ear when the headset is attached to the head of a user. So called "duo headsets" comprise a speaker for both ears and are often preferred in order to improve listening and dampen ambient noise. Monaural headsets are preferred when the user wants to hear ambient sounds and/or a compact headset. Especially Bluetooth headsets used with mobile phones are normally of the monaural type, whereby they are compact and can be carried in a pocket. The attachment means of these Bluetooth headsets are often an ear hook to be located around the outer ear or an ear bud which is inserted into and fixated in the concha. The latter is called "in the ear" headsets, as the earbud is inserted into the outer ear of the user. An example of such a headset is Jabra Extreme. These in the ear headsets may be provided with ear hooks or headbands in order to attach them better to the user's head. When using such a headset the user can hear ambient noise through the ear, which is not used for the headset. Thus, the user is not isolated from the surroundings. However, the noise from the surroundings can make it hard to hear the audio coming from the headset speaker. This is especially the case with so-called "on the ear" headphones, where ambient noise often can enter the ear canal as the earphone does not isolate the ear canal entrance from the surroundings. On-the-ear headsets requires attachment means in the form of an ear hook, ear loop, headband, neck or the like.

U.S. Pat. No. 7,031,460 describes how active noise cancelling works and a telephonic handset employing feed-forward noise cancelling.

SUMMARY

The following summary is provided to assist the reader in understanding the full disclosure and is not intended as a limitation of the scope of protection.

The specification provides, inter alia. a battery powered electronic device, such as a wireless headset, comprising a housing and a movable part extending from the housing, wherein the movable part is movably attached to the housing, such that it can be moved between a compact position and an extended position, wherein the electronic device comprises a switch, which is adapted to sense, whether the movable part is in the compact position or not, and wherein the switch is utilised to switch the electronic device On, when the movable part is in the extended position, and Off, when the movable part is in the compact position, wherein the electronics of the device is adapted to be set to Off mode or into a low-power shipping mode, all though the movable part is in the extended position. Thus, the manufacturer can package and ship the electronic device with the movable part in the extended use position without the battery being drained before the device is to be taken in use for the first time.

The switch may be any type of switch, such as a magnetic switch, an electromechanical switch, a reed switch, an optical switch The specification also provides a monaural headset comprising attachment means for attaching the headset to the head of a user, a housing with a first housing side facing a user's ear when attached and a second housing side facing away from the user's ear when attached, a speaker, a speaker opening in the first housing side, a noise microphone, an active noise cancelling circuit coupled between the speaker and the noise microphone, which active noise cancelling circuit is adapted to produce an inversed sound signal from the sound picked up by the noise microphone and to transmit the inversed sound signal to the speaker. The active noise cancellation circuit converts the ambient noise signal to a signal, which is transduced to a noise, which is in anti-phase with the ambient noise and thereby cancels it in the ear of the user.

The active noise cancelling circuit may be a feed-forward noise cancelling system, in which the noise microphone is placed at the exterior of the headset in order to capture the incoming, ambient noise signal, which is then inverted and forwarded to the receiver, thus creating the cancellation signal. A feed-forward system does not require a well sealed cavity around the user's ear. A feed-forward noise cancelling system is simple to implement.

According to the invention, the disclosure the headset may comprise a microphone arm extending from the housing, wherein the noise microphone is provided in the microphone arm.

According to a preferred embodiment, the microphone arm is movably attached to the housing, such that it can be moved between a compact position and an extended position.

The microphone arm may at a proximate end be attached to the housing by means of a hinge, whereby it is foldable between the compact position and the extended position. Such a solution can be very compact in the compact position and still have a voice microphone for receiving voice audio from the user arranged close to the mouth.

In an advantageous embodiment, the noise microphone is arranged at the proximate end of the microphone arm, whereby acoustic isolation and proximity to the user's ear can be obtained.

According to an embodiment, the foldable microphone utilised for switching the headset on and off, whereby it is switched off in the compact position and switched on in the extended position According to an embodiment, the microphone arm comprises a first arm side facing away from the speaker opening in the extended position, and wherein an audio opening leading to the noise microphone is provided on the first arm side. In this way, the noise microphone can be effectively acoustically decoupled from the speaker.

A first voice microphone may be provided at a free end of the microphone arm. In this way, feedback can be prevented, and the same time the microphone can be relatively close positioned to the mouth.

A second voice microphone is provided in the microphone arm. As there are two voice microphones for receiving voice form the users mouth, a noise reduction and or directionality can be obtained, which improves the signal received by the other end of the communication channel, i.e. a person which the headset user is having a telephone conversation with.

The headset may be wireless and comprising a rechargeable battery.

According to an embodiment, one of the housing and the microphone arm comprises magnetic sensor, such as a Hall sensor, and the other of the housing and the microphone arm comprises a magnet, which is sensed by the magnet sensor in the compact position of the microphone arm, whereby the magnet sensor is used to sense, whether the microphone arm is in the compact position or not.

Thus a magnet sensor can be located in the microphone arm and a magnet in the housing or vice versa.

The magnetic sensor can be utilised to power the headset off, when the microphone arm is in the compact position and power the headset on, when the microphone arm is in the extended position.

The headset electronics may be adapted to be set into a shipping mode, where it is powered off all though the microphone arm is in the extended position. Thus, the headset can be shipped in a package in the extended position without draining the battery. Such a feature can be use with a headset without an active noise cancelling circuit and noise microphone.

The headset may be adapted to be moved out of shipping mode by moving the microphone arm to the compact position, by pressing a headset button or by connecting a charging, data or audio cable to the headset.

The disclosure also relates to a headset package for packaging a headset with a magnet sensor, wherein the package is adapted to receive the headset with the microphone arm in the extended position, and wherein the package comprises a magnet, which is sensed by the magnet sensor of the headset, when the headset is received by the package. This headset package may also be used with a headset comprising a magnetic sensor but no active noise cancelling circuit and noise cancelling microphone.

Alternatively, headset may comprise a detachable magnetic device, which is adapted to be attached to the headset in a position, where it is sensed by the magnetic sensor. Also in this case, the headset may be packaged in an extended position and still be powered off, as the magnet sensor "believes" that the headset is in the compact position.

BRIEF DESCRIPTION OF THE DRAWINGS

The disclosure is explained in detail below with reference to the drawing illustrating a preferred embodiment of the disclosure and in which.

DETAILED DESCRIPTION

Figure 1:
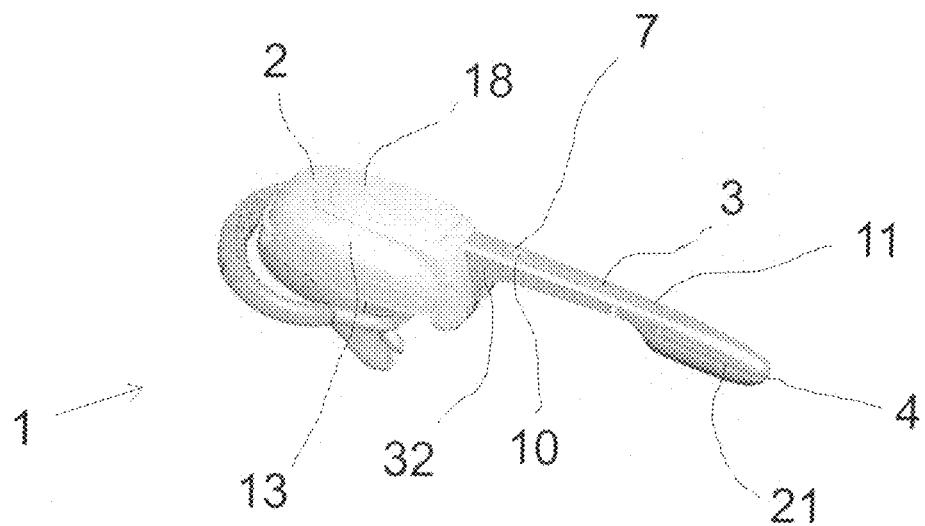
FIG. 1 is a perspective view of a first embodiment of a headset according to the disclosure seen from a first direction.
Figure 2:
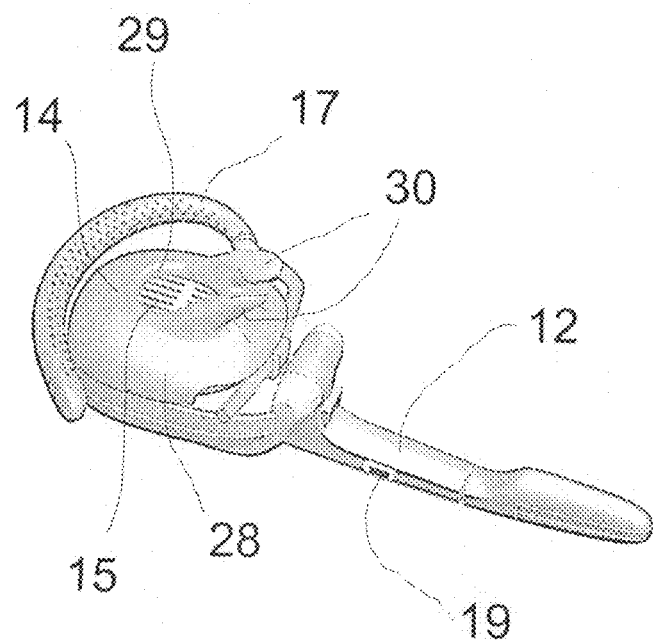
FIG. 2 is a perspective view of the headset seen from a second direction.
Figure 3:
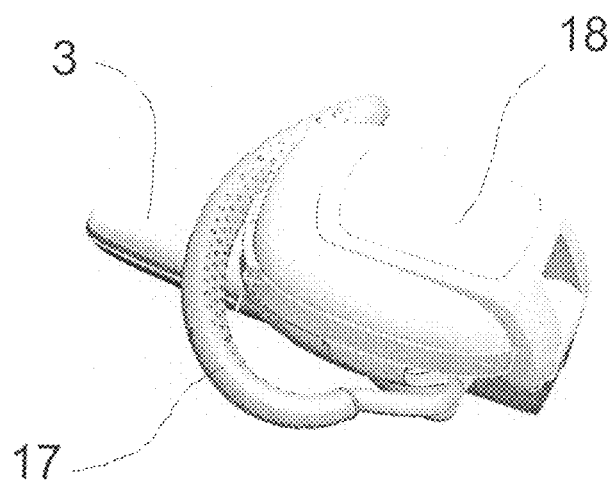
FIG. 3 is a perspective view of the headset with the microphone boom in a folded position, seen from the first direction.
Figure 4:
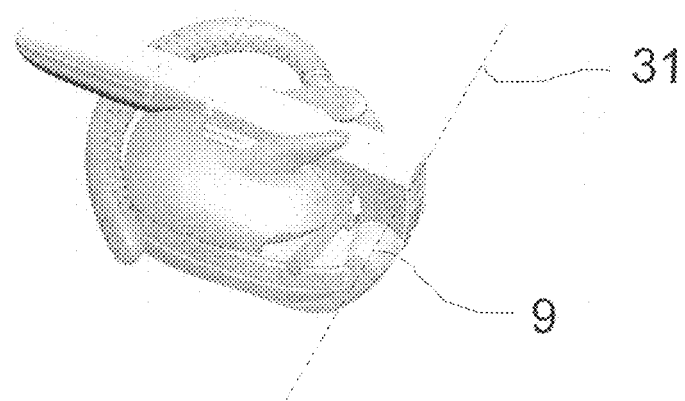
FIG. 4 is a perspective view of the headset with the microphone boom in a folded position, seen from the second direction.

FIGS. 1-4 are perspective views of a first embodiment of a headset 1 according to the disclosure. The headset 1 comprises a housing 2, a microphone arm 3 and an ear hook 17 for attaching the headset 1 to the ear of a user. The microphone arm 3 is foldably connected to the housing 2 by means of a hinge 9, whereby it can be moved between an extended position as shown in FIGS. 1 and 2 and a compact position as shown in FIGS. 3 and 4. In the compact position, the headset 1 is easier to keep in a pocket or the like. The housing 2 comprises a first side 13 which faces away from the user's ear when the headset 1 is attached to the ear, and a second side 14, which faces against the user's ear. Also, the microphone arm 3 has a first arm side 11 facing away from the user's head, when the headset 1 is attached to the ear, and a second arm side 12 facing against the user's head, when the headset 1 is attached to the ear. At the free end 4 of the microphone arm 3, a microphone slot 4 filled with foam is provided. The foam prevents wind noise from reaching two voice microphones located in the free end of the microphone arm 3. A "noise microphone" 7 is located at the proximal end 32 of the microphone arm 3. An audio opening 10 allowing ambient noise to reach the noise microphone 7 is located on the first side 11 of the microphone arm 3.

As shown in FIG. 2, an ear bud 30 is arranged on the second side 14 of the housing 2. A central ear bud opening 29 allows audio from the speaker 6 to pass to the user's ear. Two ear bud protrusions 30 extend from the earbud and are adapted to fix the ear bud 28 in the lower concha between the tragus and antitragus. A voice control button 19 is arranged on the side of the microphone arm 3.

As indicated in FIG. 3, a large multi-function button 18 is arranged on the first side 13 of the housing.

In FIG. 4, it can be seen, that the microphone arm 3 extends between the two ear bud protrusions 30, when the headset 1 is in compact position. Also shown in FIG. 4 is the hinge axis 31 about which the housing 2 and the microphone arm 3 can rotate in relation to each other. As it appears, the rotation angle between the extended position and the compact position is about 180 degrees.

Figure 5:
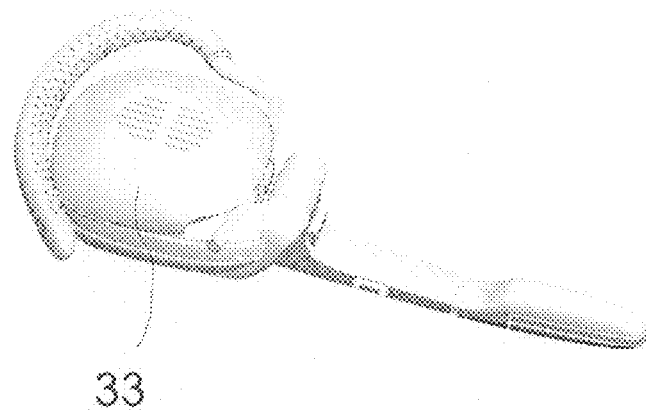
FIG. 5 is a perspective view of a second embodiment of a headset according to the disclosure, seen from a first direction.

FIG. 5 is a perspective view of a second embodiment of a headset according to the disclosure. This embodiment differs from the first embodiment shown in FIGS. 1-4 by having an ear bud 33 without protrusions. However, both embodiments are of the "on the ear" type, which means that they do not seal the ear canal from the surroundings.

Figure 6:
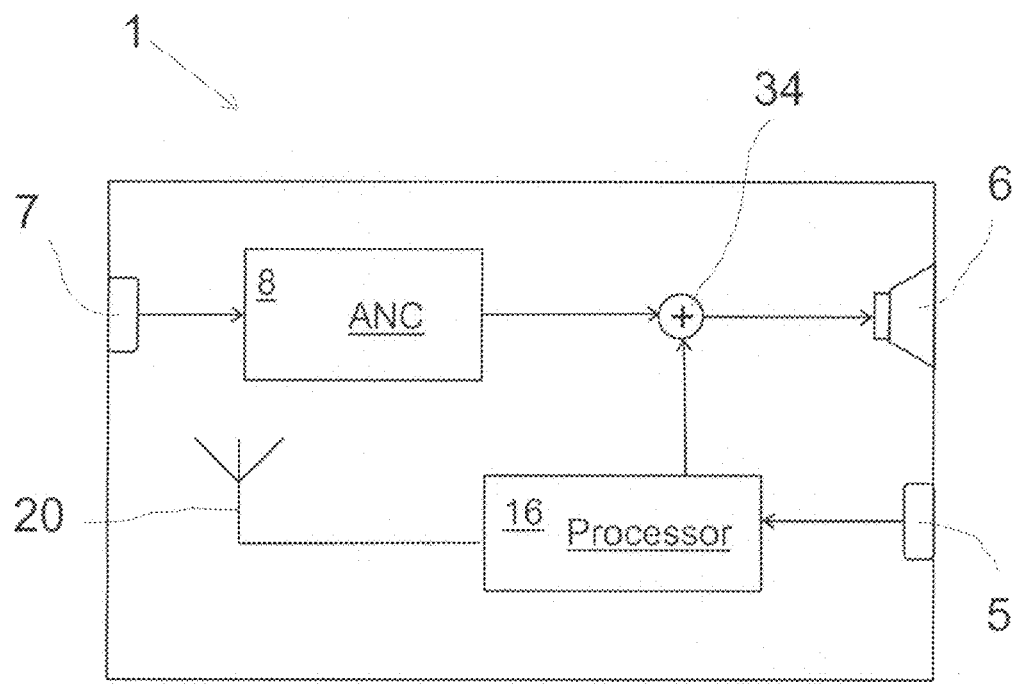
FIG. 6 is a diagram disclosing a headset with some basic components of an active feed-forward noise cancelling circuit according to a third embodiment.

FIG. 6 is a diagram disclosing the basic components of an active feed-forward noise cancelling circuit of a wireless headset 1. The headset 1 comprises a processor 16, an antenna 20 for wireless transmission and reception of audio, a voice microphone 5 for receiving the user's voice, a speaker 6 for producing sound to the user's ear, a noise microphone 7 for picking up ambient noise, an active noise cancelling circuit 8, which filters and inverses the ambient noise signal received from the noise microphone 7 and transmits it to the speaker 6. Thus, the speaker 6 produces "anti-noise" which cancels out the noise in the user's ear. The processor 16 sends an audio signal received by the antenna 20 to the speaker 6 and sends the voice signal received from the voice microphone 5 to the antenna 20 which is wirelessly connected to f. ex. a cell phone.

Figure 7:
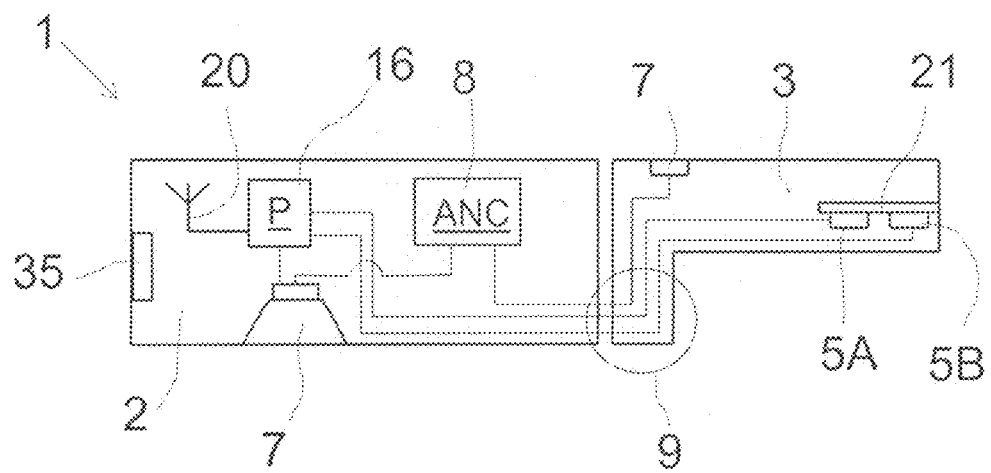
FIG. 7 is a diagram disclosing some basic electrical components of a headset according to the first embodiment of the disclosure in extended position.

FIG. 7 is a diagram disclosing some basic electrical components of a headset 1 according to the first embodiment of the disclosure in extended position. As earlier described, the headset 1 comprises a housing 2 and a microphone arm 3, which is connected to the housing 2 by means of a hinge 9. The microphone arm 3 comprises the noise microphone 7 and two voice microphones 5A, 5B. The two microphones 5A, 5B are arranged up to a slot 21 filled with foam in order to reduce wind noise, which is explained further in US 2011/129107 which is incorporated herein by reference.

A micro-USB port 35 is provided, by means of which the headset can be recharged, firmware updated or set into shipping mode as described later.

In order to obtain an efficient active noise cancelling of the feed-forward type as used here, it is normally desirable to arrange the noise microphone 7 as close to the user's ear as possible, as the noise sensed by the noise microphone hereby is very similar to the noise at the ear. However, if the noise microphone 7 is arranged to close to the speaker 6, there is a risk of acoustic feedback under certain circumstances. However, as the noise microphone is arranged in the microphone arm and not the housing 2, the risk of acoustic feedback is reduced. However, as the noise microphone 7 is located in the proximal end 32 of the microphone arm 3, it is close enough to the user's ear to provide efficient noise cancelling. The distance between speaker opening 15 and the audio opening 10 of the noise microphone 7 is approximately 3 cm in the embodiments shown in FIGS. 1-5 when the headset 1 is in the extended position.

Figure 8:
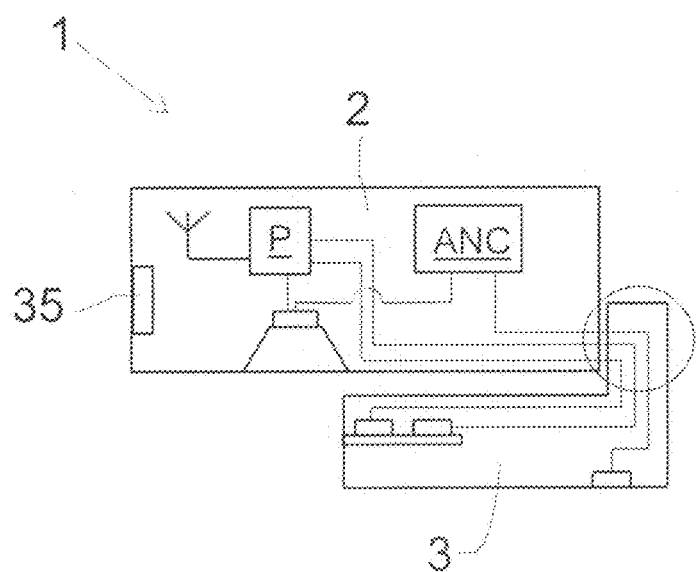
FIG. 8 is a diagram disclosing some basic electrical components of a headset according to the first embodiment of the disclosure in compact position.

FIG. 8 is a diagram disclosing the same as in FIG. 7, but in the compact position of the headset 1.

Figure 9:
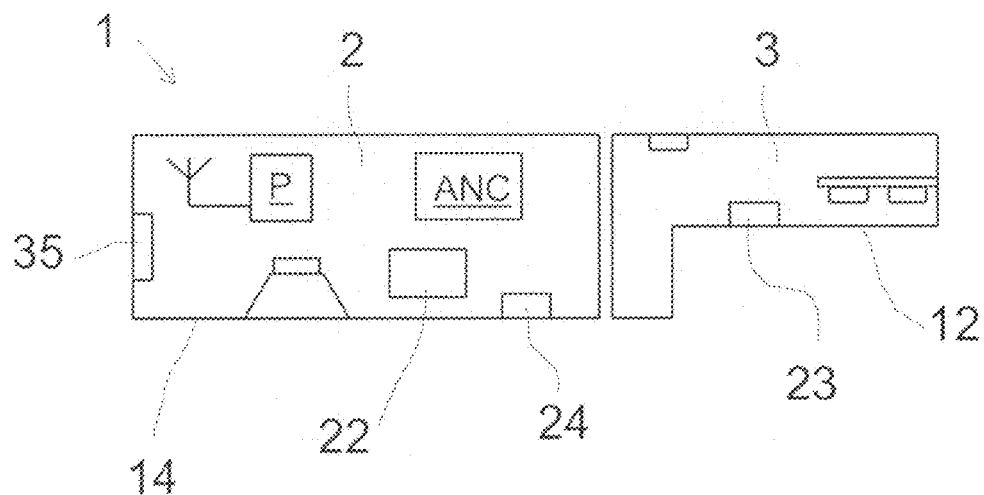
FIG. 9 is a diagram disclosing sensing means sensing whether the headset is in extended position or compact position, in extended position.
Figure 10:
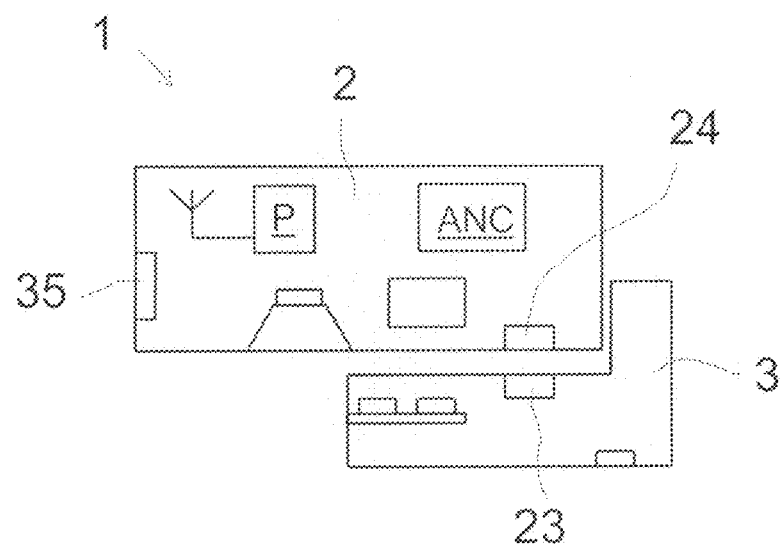
FIG. 10 is a diagram disclosing the same as FIG. 9, but the headset in compact position, FIG. 11 a headset package with a headset according to the disclosure, and FIG. 12 a headset according to another embodiment comprising a detachable magnetic device.

FIG. 9 is a diagram disclosing sensing means sensing whether the headset is in extended position or compact position, in extended position. Thus, the microphone arm 3 comprises a Hall sensor 23 on its second side 12 and the housing 2 comprises a magnet 24 on its second side 14. When the headset 1 is in its compact position as shown in FIG. 10, the hall sensor 23 and the magnet 24 are close to each other whereby the Hall sensor senses the magnet 24 and causes the headset electronics to power down.

Figure 11:
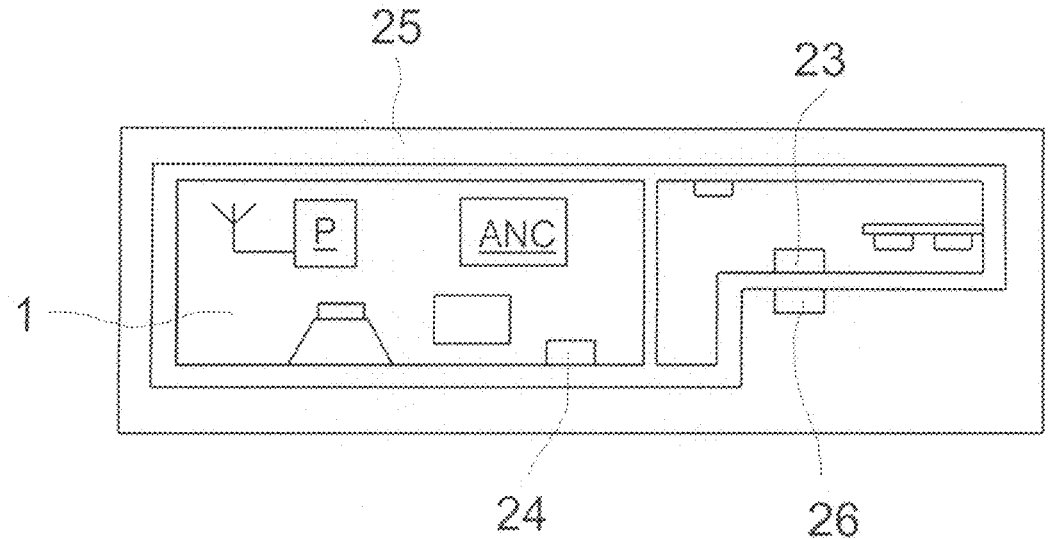

FIG. 11 discloses a headset package 25 with a headset 1 according to the disclosure. The package 25 is adapted to receive and hold the headset 1 in extended position in which the headset normally would be powered on. As the headset 1 can be arranged in the package 25 for a very long time before it is sold and started to be used the battery would be drained if the headset was switched on. However, the package 25 is provided with a magnet 26 in a position where it is sensed by the Hall sensor 23. Thus, the headset 1 "believes" that it is in the compact position and powers the electronics off until a user takes the headset 1 out of the package 25.

Figure 12:
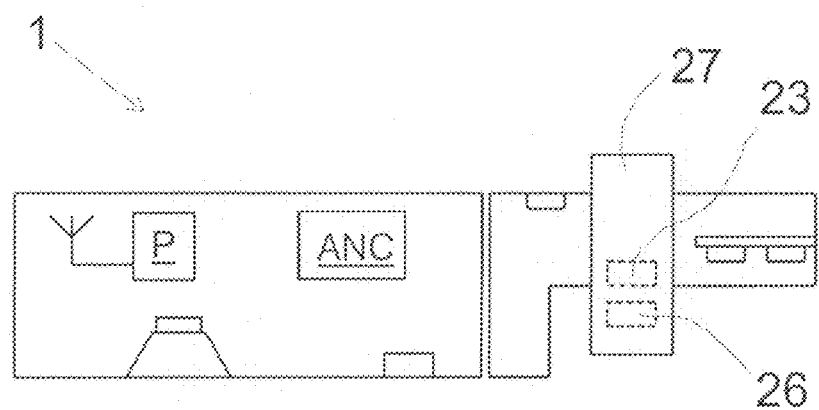

FIG. 12 discloses a headset 1 according to another embodiment comprising a detachable magnetic device 27. This magnetic device 27 comprises a magnet 26 and is arranged on the microphone arm 3 whereby it fulfils the same task as the package 25. Thus, the headset electronics are powered off as long as the magnetic device 27 is arranged on the microphone arm 3.

Figure 13:
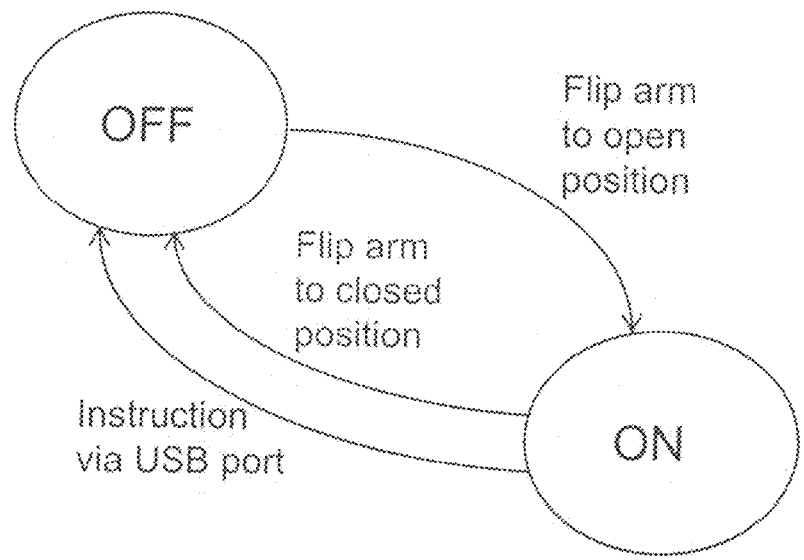
FIG. 13 is a state-machine disclosing how a battery powered electronic device can shift states.

FIG. 13 is a state-machine disclosing how a battery powered electronic device, such as a wireless headset 1, can shift states. As shown, the device can switch from Off mode to On mode by moving the microphone arm 3 from the compact position to the extended position. Likewise, the device can switch from On mode to Off mode by moving the microphone arm 3 from the extended position to the compact position. However, the headset 1 can also be switched between On mode and Off mode by means of a USB plug plugged into a combined charging and signal USB socket in the headset 1. Thus, at the factory, the headset can be set into Off mode and use this as "shipping mode" all though the microphone arm 3 is in the extended position, f. ex. by means of a signal sent via the USB cable to the power controlling circuit of the headset 1, which is instructed to power off the headset 1 regardless the position of the microphone arm 3. In this way, the headset can be packaged in a presentable matter with extended microphone arm without draining the battery. Thus, the end user is not forced to charge the battery before he can use the headset for the first time. Also, if the battery is stored for a long time in discharged condition, the life of the battery and the capacity of the battery is reduced. Normally, a lithium-ion battery is charged 40-50% of its full charge from factory, as this keeps the battery in the best condition. A fully charged battery is stressed, as the voltage is higher, which increases lithium deposition on the electrodes, which again shortens battery life and the number of cycles the battery can be recharged with acceptable capacity. If the battery is only charged a little or completely drained, the electrodes corrode faster, which again shortens battery life.

When the end user is going to use the headset for the first time, he must de-activate the low power shipping mode. He is doing this by inserting a USB-plug into the USB-socket of the headset, whereby the power controlling circuit of the headset is instructed to leave the shipping mode, where after it is controlled by the switch activated by the arm 3.

Figure 14:
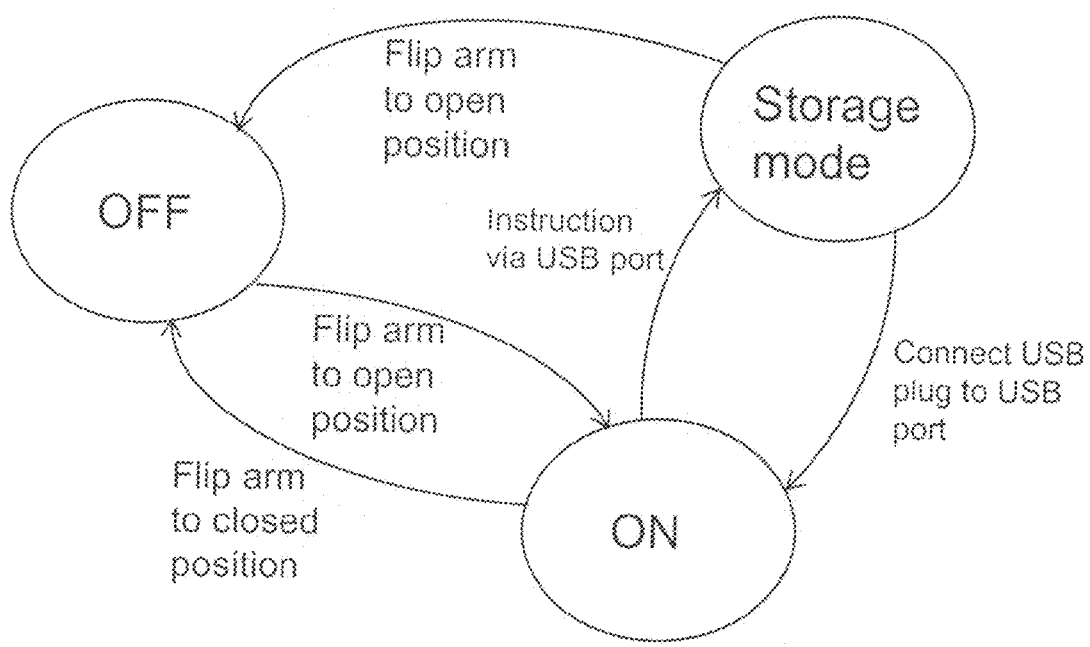
FIG. 14 is a state-machine according to another embodiment.

FIG. 14 discloses an alternative embodiment, where the headset can switch between ON, OFF and a separate shipping mode. At the factory, the headset 1 is put into a special shipping mode, where the electronics consumption is zero or close to zero. When the headset is to be used for the first time, the end user, or anyone else, plugs a USB plug into the USB socket of the headset or simply moves the arm 3 into the compact position and back to the extended position to turn it ON. A team of hardware and software engineers my implement this by utilising a power management module of the chipset or alternatively make use of the PCM (protection circuit module) of the battery. Modern lithium-ion batteries are provided with a PCM in order to power the battery down if there is condition requiring this, f. ex. if the battery voltage or temperature is outside safe intervals. Thus, by sending a signal to the PCM, making the PCM believe that something is wrong, it will shut down the battery, until another signal is send to return from shipping mode. Thus, the battery's PCM "power down mode" is utilised as a headset "shipping mode".

Typical current consumption in shipping mode is 0.1-1 µA. Typical power consumption in Off mode is 0.1-1 mA. Typical power consumption in On mode is 2-20 mA.

Figure 15:
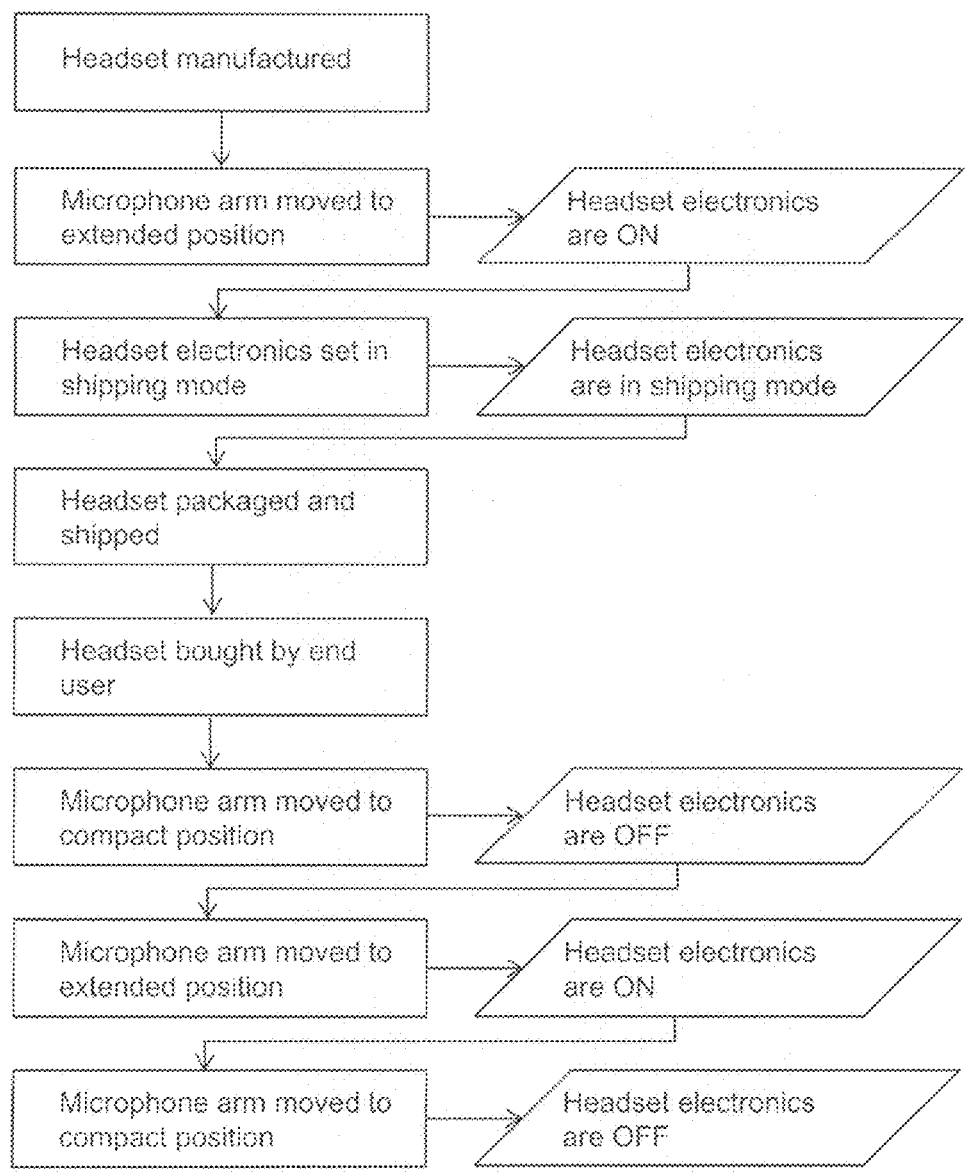
FIG. 15 is a flowchart disclosing different steps on the way of a headset according to the disclosure to an end user.

FIG. 15 is a flowchart disclosing different steps on the way of a headset according to the disclosure from a factory to an end user. The boxes in the left row are process steps and the parallelograms in the right row are states of the headset electronics. The headset is manufactured, and the microphone arm is moved to the extended position, whereby the headset electronics are turned ON. A signal is sent via the USB port of the headset instructing the headset electronics to power down to shipping mode, where only the power management module is consuming power and this is in a very small amount. The headset is packaged with the microphone arm in the extended position in a package with a transparent window and shipped to a telecommunications store. In the telecommunications store, an end user picks up the package, study the headset with the microphone arm in the extended position and decides to buy the headset. The end user brings the headset home, takes it out of the package, flips the microphone arm to the compact position and back to the open position, whereby the headset is switched ON and ready for use. The user may alternatively plug the enclosed charging cable into the socket of the headset, whereby the headset is switched out of shipping mode and into On mode or Off mode dependent on the position of the microphone arm. Charging is not necessary, as the battery is only discharged a little since it left the factory.

Another way of setting the battery powered device into shipping mode could be to plug in a special shipping mode plug to an electrical socket of the device. F. ex. a µ-USB dongle with a special circuit or shortcut between some of the poles could be plugged in from the factory. When the user removes, the plug from the socket, the device will leave the shipping mode and enter On mode or Off mode in dependence of the position of the movable part.

The battery saving methods disclosed here may be used for other battery powered devices than wireless headsets, such as speakerphones, conference devices, flip phones and portable computers, such as laptops and netbooks. The movable part may be smaller or of approximately the same size as the housing. This is the case with flip phones and portable computers, where the part comprising the display may be regarded as the "movable part".

The active noise cancelling circuit may be switched off when it is not needed. This can be done by means of the headset user interface, such as the multi-function button 18 or by voice control. However, it may also be controlled by a connected smartphone which has an "app" installed for the purpose. This app could also be used to adjust some parameters relating to the active noise cancelling circuit.

The active noise cancelling circuit used is very simple and is not adaptive, which means it has a fixed or some fixed filter characteristics. However, the level of the active noise cancelling signal sent to the speaker may be adjustable. Thus, an application installed on a smartphone or tablet computer may be used to adjust the level of active noise cancelling. F. ex. the headset may have three levels of active noise cancelling, which may be named "Office", "Outside" "Car", as they are assessed to be suitable for these environments. The user may choose one of these levels by touching a correspondent icon on his smartphone. The application may also be use the smartphones or tablet computers own microphone to detect the surrounding sound level and automatically select the active noise cancelling level in dependence of this detection.

In addition, other parameters not relating to the active noise cancelling circuit, such as equalising and muting may be adjusted by means of the application. The application may also provide a graphical user interface for "multiuse" functionality, which means that the user by means of the application can select which device he wants to wirelessly connect the headset to.

REFERENCE SIGNS 1 headset
2 housing
3 microphone arm
4 free end of microphone arm
5 voice microphone
6 speaker
7 noise microphone
8 active noise cancelling circuit
9 hinge
10 audio opening
11 first arm side
12 second arm side
13 first side of housing
14 second side of housing
15 speaker opening
16 headset processor
17 ear hook
18 multi function button
19 voice control button
20 antenna
21 microphone slot
22 rechargeable battery
23 Hall sensor
24 magnet
25 package
26 external magnet
27 magnet holder
28 ear bud
29 earbud opening
30 earbud protrusion
31 hinge axis
32 proximal end of microphone arm
33 ear bud
34 summation point
35 micro-USB port

The invention claimed is:

1. A battery powered electronic device comprising a housing and a movable part extending from the housing, wherein the movable part is movably attached to the housing, such that it can be moved between a compact position and an extended position, wherein the electronic device comprises a switch, which is adapted to sense, whether the movable part is in the compact position or not, and wherein the switch is utilised to switch the electronic device On, when the movable part is in the extended position, and Off, when the movable part is in the compact position, wherein the electronics of the device is adapted to be set to a low-power shipping mode, all though the movable part is in the extended position.

2. A battery powered electronic device according to claim 1, wherein the switch is a magnetic switch and wherein one of the housing and the movable part comprises a magnetic sensor, and the other of the housing and the movable part comprises a magnet.

3. A package for packaging an electronic device according to claim 2, wherein the package is adapted to receive the electronic device with the movable part in the extended position, and wherein the package comprises a magnet, which is sensed by the magnetic sensor of the headset, when the headset is received by the package.

4. A battery powered electronic device according to claim 2, wherein it comprises a detachable magnetic device, which is adapted to be attached to the headset in a position, where it is sensed by the magnetic sensor.

5. A battery powered electronic device according to claim 1, wherein the movable part has a length which is more than a third of the longest dimension of the housing.

6. A battery powered electronic device according to claim 1, wherein movable part at a proximate end is attached to the housing by a hinge, whereby it is foldable between the compact position and the extended position.

7. A battery powered electronic device according to claim 1, where the movable part is slidably attached to the housing, whereby it can slide between the compact position and the extended position.

8. A battery powered electronic device according to claim 1, wherein the electronic device comprises an electric port and wherein the electronic device can be moved out of shipping mode by connecting a charging, data or audio plug to the electric port.

9. A battery powered electronic device according to claim 1, wherein the electronic device can be moved out of shipping mode by moving the movable part to the compact position.

10. A battery powered electronic device according to claim 1, wherein the electronic device wherein the electronic device comprises a button and can be moved out of shipping mode by activating the button.

11. A battery powered electronic device according to claim 1 comprising a rechargeable battery.

12. A battery powered electronic device according to claim 1, wherein the movable part is a microphone arm comprising a microphone.

13. A battery powered electronic device according to claim 1, wherein the electronic device is a wireless headset.

14. A wireless headset according to claim 13, wherein it comprises an attachment for attaching the headset to the head of a user and a speaker.

15. A battery powered electronic device according to claim 1, wherein the electronic device is a speakerphone, wherein the housing comprises a speaker and the movable part is a microphone arm.

16. A battery powered electronic device comprising a housing and a movable part extending from the housing wherein the movable part is movably attached to the housing, such that it can be moved between a compact position and an extended position, wherein the electronic device comprises a switch, which is adapted to sense, whether the movable part is in the compact position or not, and wherein the switch is utilized to switch the electronic device On, when the movable part is in the extended position, and Off, when the movable part is in the compact position, wherein the electronics of the device is adapted to allow override of the switch and put the device in a low-power shipping mode, even when the movable part is in the extended position.

17. Device of claim 16 wherein low power includes no power.

* * * * *